July 12, 1938. D. MARINSKY 2,123,513
SLIDER END STOP COUPLING FOR SEPARABLE FASTENERS
Filed Feb. 2, 1937
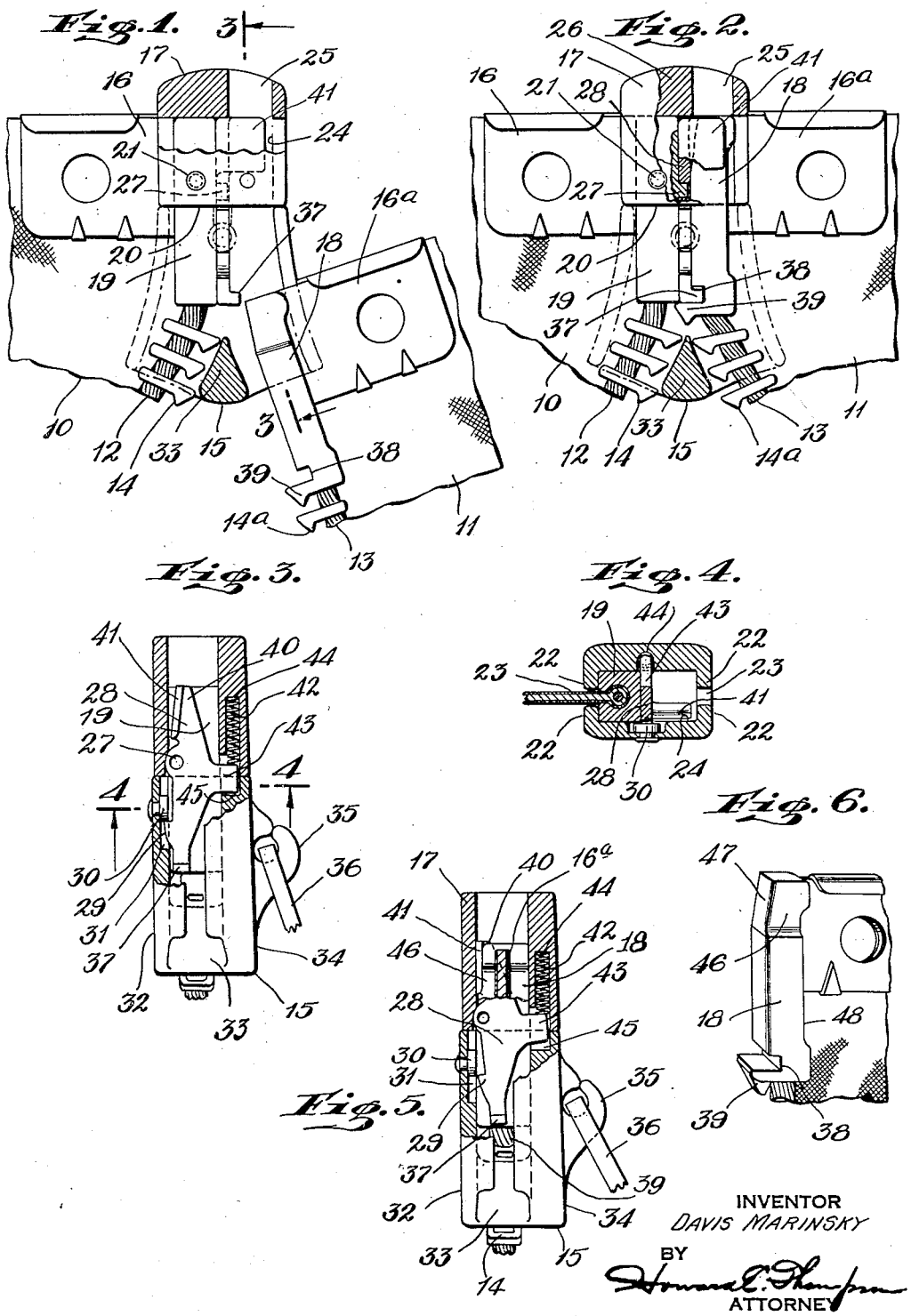
INVENTOR
DAVIS MARINSKY
BY
ATTORNEY Patented July 12, 1938

2,123,513

UNITED STATES PATENT OFFICE 2,123,513

SLIDER END STOP COUPLING FOR SEPARABLE FASTENERS

Davis Marinsky, Bronx, N. Y., assignor to Whitehall Patents Corporation, Bronx, N. Y., a corporation of New York Application February 2, 1937, Serial No. 123,611

20 Claims. (Cl. 24—205)

This invention relates to separable fasteners employing stringers with coupling links arranged longitudinally of the stringers for coupling the same together and particularly stringers employing detachably coupled end stops at one end thereof, permitting separation of the stringers and still more particularly to devices of this class wherein the slider and end stop have interengaging means retaining said parts against displacement when the stringers are separated; and the object of the invention is to provide a device of the class described wherein the end stop or the housing part thereof includes a latch or pawl element in connection with which the other pin part of the end stop is detachably coupled and cooperates with the latch or pawl element to control engagement and disengagement of said element with the slider so as to retain the slider against displacement from the housing part of the end stop when the pin part is detached and further, so that the insertion of the pin part will release the slider, permitting the coupling of the fastener stringers; a further object being to provide coupling means between the end stop and slider which is disposed centrally and longitudinally of said parts to maintain adjacent surfaces of the parts in substantially parallel relation, thus maintaining the slider in proper position, facilitating free insertion and removal of the pin part and further wherein the latching or coupling element is completely housed within the end stop and slider when said parts are coupled together, thus preventing accidental displacement of said parts from an external source; a further object being to provide a device of the class described, wherein the coupling elements are disposed within boundary walls of the end stop and slider, thereby eliminating unnecessary and undesirable projections on said parts; a further object being to provide the pin part of the end stop with an integrally formed link adapted to interlock with the links of the stringer, thereby providing predetermined arrangement between the pin part and end link of the stringer to which the same is attached; a still further object being to provide means for coupling the pawl or latching element with the pin part adjacent the integral link thereon to aid in retaining the end stop parts in proper relation with each other when coupled together; a still further object being to provide the housing portion of one of the end stop parts with a large opening arranged in the end wall thereof in alinement with the socket for the pin part to provide means for discharging or ejecting any particle that may accidentally or otherwise enter the channel to insure proper coupling of the end stop parts; and with these and other objects in view, the invention consists in a device of the class and for the purpose specified, which is simple in construction, efficient in use, and which is constructed as hereinafter described and claimed.

The invention is an improvement on the disclosure in applications, Serial No. 78,604, filed May 8, 1936 and Serial No. 106,961, filed October 22, 1936 and is fully disclosed in the following specification, of which the accompanying drawing forms a part, in which the separate parts of my improvement are designated by suitable reference characters in each of the views, and in which:

Fig. 1 shows a face and sectional view of one end portion of the stringers of a separable fastener, diagrammatically illustrating detached relationship of the stringer ends.

Fig. 2 is a view similar to Fig. 1 showing the parts coupled together, with additional parts broken away and in section.

Fig. 3 is a partial section on the line 3—3 of Fig. 1 with the pin part detached.

Fig. 4 is a section on the line 4—4 of Fig. 3.

Fig. 5 is a view similar to Fig. 3 showing one end portion of the pin part in the position shown in Fig. 2 with the remainder of the pin part broken away; and, Fig. 6 is a perspective view of the end portion of the stringer provided with the pin part thereon.

In Figs. 1 and 2 of the drawing, I have indicated at 10 and 11 one end portion of the stringer or stringer tapes of a separable fastener, to the beaded edges 12 and 13 of which are secured the coupling links or scoops 14 and 14a employed for coupling and uncoupling the stringers by the movement of a slider 15 longitudinally of the stringers as in other devices of this kind. In some forms of construction, metallic plates or other means of reinforcement 16, 16a are attached to one end of the stringers and detachably coupled end stop parts 17 and 18 are secured to these edges and are employed for detachably connecting the stringer ends to provide complete separation of the stringers.

The part 17, in the construction shown, consists of a unitary channeled body, in one side part of which is fixedly secured a bar 19 which projects outwardly through the inner open end 20 of the part 17, the bar being secured to the part 17 by a rivet or in any other desired manner as indicated at 21. The side edges of the part 17 include inturned flanges 22, between which are passages 23 to receive the stringer tapes 10 and 11 or the reinforcements 16, 16a attached thereto. At the opposite side of the part 17 is a channel 24 for receiving the pin part 18, and this channel in addition to opening through the inner end 20 of the part 17 also has a passage 25 extending through the crosshead or outer wall 26 of said part so that any particles of foreign matter that may collect in the channel 24 will be discharged through the aperture 25 automatically in the insertion of the pin 18.

The bar 19 is provided on the inner surface thereof, or, in other words, the surface exposed to the channel 24, with an inwardly extending stud 27 forming a pivot pin upon which a ratching element or pawl 28 is mounted. The element 28 is in the form of a thin flat plate arranged upon the inner surface of the bar 19, and the lower edge of this element is provided with a projecting tongue or catch 29 adapted to engage a pin or other stop part 30 disposed in a recess 31 formed on the inner surface of the bottom wall 32 of the slider 15 adjacent the contracted end of the slider. The wide end portion of the slider has the usual substantially triangular bridging portion 33 which joins the bottom wall 32 with the top wall 34 of the slider and also divides said wide or flared end into diverging channels through which the links 14, 14a pass as in other devices of this kind. The top wall 34 is provided with suitable means 35 for pivoting or otherwise coupling a finger piece or pull 36 therewith to facilitate operation of the slider as partially illustrated in Fig. 3 of the drawing.

The element 28 extends forwardly beyond the projection 29 and said extension is provided with a laterally offset flange 37 adapted to freely enter a recess 38 formed in the pin part 18 adjacent a link portion 39 integrally formed on the pin part. The link portion 39 is made to interlock with the link 14 of the opposed stringer when the stringers are coupled together, and by forming the link part 39 integral with the pin 18 a definite relationship is established between the end link 39 of the stringer 11 and said pin part, thus maintaining the stringers in proper position one with respect to the other when coupled together, and substantially eliminating displacement of the stringers when coupled together.

The other or outwardly projecting end 40 of the element 28 is preferably of the form shown in Fig. 3 of the drawing to facilitate vertical rocking or swinging movement of the element within the channel 24. The lower edge of the end portion 40 is provided with a laterally extending wide flange portion 41 which presents within the channel 24 a cam surface in connection with which the outer end of the pin part 18 operates as illustrated in Fig. 5 of the drawing to disengage the tongue or projection 29 from the pin 30 to facilitate detachment of the slider from the part 17 when it is desired to couple the fastener stringers. In this connection, it will also be understood that in detaching the pin part 18 from the part 17, the projection 29 will automatically be moved into its locked position or engagement with the pin 30 by the action of a spring 42 upon a projection 43 on the element 28. The spring 42 is arranged in a hole or passage 44 in the body 17 as clearly seen in Fig. 3 of the drawing. The projection 43 is so arranged upon the element 28 as to extend beyond the end 20 of the part 17, thus being adapted to enter a recess 45 formed on the inner surface of the top wall 34 of the slider at the contracted end thereof. This construction will aid in maintaining alinement of the slider upon the part 17 when the pin part 18 is detached. The outer end portion of the pin part 18 is reduced on its lower surface as seen at 46 to provide clearance for the flange or cam portion 41, as indicated in Fig. 5 of the drawing.

The outer edge of said end of the pin part is beveled as seen at 47 to provide rocking movement of the pin part within the part 17 and the slider 15 in the operation of engaging and disengaging the pin part. The inner edge of the pin part is recessed as seen at 48 between its ends to provide sufficient clearance for free insertion and removal of the pin part, as will be apparent from a consideration of Figs. 1 and 2 of the drawing. In other words, in moving the pin part 18 from the position shown in Fig. 2 to that shown in Fig. 1, the end portion of the pin part having the integral link 39 is first swung laterally to disengage the flange 37 from the recess 38 after which the pin part is free to pass outwardly through the channel 24 and the channel at one side of the slider 15. In assembling the parts, the above operation is reversed, it being understood that the movement of the pin part 18 in the direction of the bar 19 will be automatic in moving the slider away from the part 17 in coupling the stringers together.

In the operation of moving the slider 15 in the direction of the end stop or into abutment with the edge 20 of the part 17 in the operation of detaching the stringer ends, the force or engagement will tend to automatically detach the pin part 18 from the part 17, in which operation, the releasing of the element 28 will cause said element or the projection 29 thereof to snap into engagement with the pin 30, providing an instantaneous coupling of the slider with the end stop. This slider will remain in constant engagement with the part 17 and be retained against displacement therefrom until the pin part has been re-inserted into proper position. In this way, the objection to devices of this kind as commonly used in the past, and the inconvenience and annoyance of properly retaining the slider and end stop in position are obviated. In other words, the recoupling operation is materially simplified and rendered substantially fool-proof.

While I have illustrated certain specific forms of end stop parts, my invention is not limited to any particular form and construction of these parts as the latching or coupling means herein disclosed is adaptable for use in conjunction with other devices of this kind including different forms of sliders, especially in producing devices of this kind wherein the latching element is completely housed within the end stop and slider when said parts are coupled together.

One of the distinctive features of the present invention resides in the provision of a latching element which is movable in a vertical plane within the channel of the end stop part and the slider on a horizontally disposed pivot when considering the device from the standpoint of the top wall 34 of the slider and the bottom wall 32 thereof, distinguishing in this respect from the vertically disposed pivot and horizontal or lateral movement of the latching element as disclosed in my prior application, Serial Number 106,962, of which this application constitutes a continuation in part. Said application having since issued in Patent No. 2,103,037, dated December 21, 1937, and on which reissue application Serial No. 207,991, dated May 14, 1938, has been filed.

The portion 39 which is integral with the pin part 18, takes the place of one of the end links 14a and is simply employed to provide a more substantial or rigid coupling of the stringers adjacent the parts 18 and 19 attached thereto. In some forms of construction, the portion 39 may be eliminated, it being understood in this connection that other changes in the specific structure of the several parts may be made as long as the fundamental principles of the latching or coupling means are maintained between the slider and the end stop. By employing a coupling between the slider and end stop, attachment and detachment of the stronger parts is only possible when the slider is in juxtaposition to or coupled with the end stop, thus eliminating any possible attempt to improperly couple the links of the respective stringers in closing the fastener.

Having fully described my invention, what I claim as new and desire to secure by Letters Patent, is:

1. In separable fasteners employing stringers and a slider movable longitudinally of the stringers to couple and uncouple the same, an end stop coupling one end of said stringers, a latching or coupling element movably supported within the end stop to move upwardly and downwardly with respect to the upper and lower walls thereof, said slider being movable into close proximity to said end stop, and interengaging means on the slider and said element for retaining the slider against displacement from said end stop in at least one position of said element, and means for normally supporting said element in said position.

2. In separable fasteners employing stringers and a slider movable longitudinally of the stringers to couple and uncouple the same, an end stop coupling one end of said stringers, a latching or coupling element movably supported within the end stop to move upwardly and downwardly with respect to the upper and lower walls thereof, said slider being movable into close proximity to said end stop, interengaging means on the slider and said element for retaining the slider against displacement from said end stop in at least one position of said element, means for normally supporting said element in said position, said end stop involving a detachable pin part movable through the slider and into the other part of the end stop, and interengaging means on said pin part and element for moving the element into position disengaging the slider, permitting movement thereof longitudinally of the stringers.

3. In separable fasteners employing stringers and a slider movable longitudinally of the stringers to couple and uncouple the same, an end stop coupling one end of said stringers, a latching or coupling element movably supported within the end stop to move upwardly and downwardly with respect to the upper and lower walls thereof, said slider being movable into close proximity to said end stop, interengaging means on the slider and said element for retaining the slider against displacement from said end stop in at least one position of said element, means for normally supporting said element in said position, said end stop involving a detachable pin part movable through the slider and into the other part of the end stop, interengaging means on said pin part and element for moving the element into position disengaging the slider, permitting movement thereof longitudinally of the stringers, and other means on said element and pin part for retaining said parts against relative longitudinal movement one upon the other when the stringers are coupled together.

4. In separable fasteners employing stringers and a slider movable longitudinally of the stringers to couple and uncouple the same, an end stop coupling one end of said stringers, a latching or coupling element movably supported within the end stop to move upwardly and downwardly with respect to the upper and lower walls thereof, said slider being movable into close proximity to said end stop, interengaging means on the slider and said element for retaining the slider against displacement from said end stop in at least one position of said element, means for normally supporting said element in said position, said end stop involving a detachable pin part movable through the slider and into the other part of the end stop, interengaging means on said pin part and element for moving the element into position disengaging the slider, permitting movement thereof longitudinally of the stringers, other means on said element and pin part for retaining said parts against relative longitudinal movement one upon the other when the stringers are coupled together, and means on said element for keying the end stop and slider against lateral movement one upon the other when coupled together.

5. In separable fasteners employing stringers with interengaging links thereon and a slider movable longitudinally of said stringers to cause engagement and disengagement of said links, a detachable end stop at one end of the stringers, said end stop involving cooperating elements for securing said end of the stringers against displacement, a coupling pawl arranged and movable vertically within one element of the end stop, said pawl projecting from said element to engage the slider when moved into close proximity thereto to retain said slider against displacement from said element, and the other element being movable through the slider and into the first named element and cooperating with said pawl to move the same into position to actuate the pawl and release the slider when said elements are in coupled relation with each other.

6. In separable fasteners employing stringers with interengaging links thereon and a slider movable longitudinally of said stringers to cause engagement and disengagement of said links, a detachable end stop at one end of the stringers, said end stop involving cooperating elements for securing said end of the stringers against displacement, a coupling pawl arranged and movable vertically within one element of the end stop, said pawl projecting from said element to engage the slider when moved into close proximity thereto to retain said slider against displacement from said element, the other element being movable through the slider and into the first named element and cooperating with said pawl to move the same into position to actuate the pawl and release the slider when said elements are in coupled relation with each other, and means for normally supporting the pawl in engagement with the slider when the second named element is detached.

7. In separable fasteners employing stringers with interengaging links thereon and a slider movable longitudinally of said stringers to cause engagement and disengagement of said links, a detachable end stop at one end of the stringers, said end stop involving cooperating elements for securing said end of the stringers against displacement, a coupling pawl arranged and movable able vertically within one element of the end stop, said pawl projecting from said element to engage the slider when moved into close proximity thereto to retain said slider against displacement from said element, the other element being movable through the slider and into the first named element and cooperating with said pawl to move the same into position to actuate the pawl and release the slider when said elements are in coupled relation with each other, means for normally supporting the pawl in engagement with the slider when the second named element is detached, and the second named element including an integral link adapted to interlock with the end link of the opposed stringer in coupling the stringers together.

8. In separable fasteners employing stringers with interengaging links thereon and a slider movable longitudinally of said stringers to cause engagement and disengagement of said links, a detachable end stop at one end of the stringers, said end stop involving cooperating elements for securing said end of the stringers against displacement, a coupling pawl arranged and movable vertically within one element of the end stop, said pawl projecting from said element to engage the slider when moved into close proximity thereto to retain said slider against displacement from said element, the other element being movable through the slider and into the first named element and cooperating with said pawl to move the same into position to actuate the pawl and release the slider when said elements are in coupled relation with each other, means for normally supporting the pawl in engagement with the slider when the second named element is detached, the second named element including an integral link adapted to interlock with the end link of the opposed stringer in coupling the stringers together, and said pawl including a part keyed to said second named element to prevent relative sliding movement of said elements when the stringers are coupled together.

9. In separable fastener stringers having an end stop at one end for detachably coupling the stringers and a slider for coupling the stringers and movable into position adjacent the end stop prior to detachment of the stringers, means for retaining the slider against displacement from the end stop when the stringers are detached, said means comprising a pawl arranged within and movable upwardly and downwardly with respect to the top and bottom walls of the end stop and said slider, tensional means for supporting the pawl in operative position, said end stop involving detachable parts, one on each stringer, and means whereby the coupling of said parts will move said pawl into inoperative position to release the slider for free movement and from and toward said end stop.

10. In detachably coupled separable fasteners of the class described employing stringers having coupling links spaced longitudinally of adjacent edges thereof, an end stop at one end of the stringers consisting of detachably coupled parts, one part comprising a channeled body and the other part a pin member movable into and out of the channel of said body and a slider movable along the stringers to couple and uncouple said links and adapted when in juxtaposition to said end stop to release said parts, said channeled part and slider having substantially straight top and bottom walls, and means housed within the top and bottom walls of said channeled part and slider when in close proximity to each other and movable toward and from said walls for coupling and uncoupling the slider with said channeled part in the removal and insertion of the pin part with respect to said channeled part.

11. In detachably coupled separable fasteners of the class described employing stringers having coupling links spaced longitudinally of adjacent edges thereof, an end stop at one end of the stringers consisting of detachably coupled parts, one part comprising a channeled body and the other part a pin member movable into and out of the channel of said body and a slider movable along the stringers to couple and uncouple said links and adapted when in juxtaposition to said end stop to release said parts, said channeled part and slider having substantially straight top and bottom walls, means housed within the top and bottom walls of said channeled part and slider when in close proximity to each other and movable toward and from said walls for coupling and uncoupling the slider with said channeled part in the removal and insertion of the pin part with respect to said channeled part, and means for supporting said last named means in operative or coupled position when the pin part is detached.

12. In detachably coupled separable fasteners of the class described employing stringers having coupling links spaced longitudinally of adjacent edges thereof, an end stop at one end of the stringers consisting of detachably coupled parts, one part comprising a channeled body and the other part a pin member movable into and out of the channel of said body and a slider movable along the stringers to couple and uncouple said links and adapted when in juxtaposition to said end stop to release said parts, said channeled part and slider having substantially straight top and bottom walls, a coupling element mounted upon a horizontal pivot within the channel part and housed within said part and the slider, means on said element and slider for retaining the slider against displacement from said housing part, and means on said element engaged by the pin part when inserted into the housing part for moving said element into position, releasing the slider from said housing part.

13. In detachably coupled separable fasteners of the class described employing stringers having coupling links spaced longitudinally of adjacent edges thereof, an end stop at one end of the stringers consisting of detachably coupled parts, one part comprising a channeled body and the other part a pin member movable into and out of the channel of said body and a slider movable along the stringers to couple and uncouple said links and adapted when in juxtaposition to said end stop to release said parts, said channeled part and slider having substantially straight top and bottom walls, a coupling element mounted upon a horizontal pivot within the channel part and housed within said part and the slider, means on said element and slider for retaining the slider against displacement from said housing part, means on said element engaged by the pin part when inserted into the housing part for moving said element into position releasing the slider from said housing part, and said element having a laterally projecting member adapted to enter a recess in the pin part to retain the pin part against movement with respect to the housing part when the stringers are coupled.

14. In detachably coupled stringers for separable fasteners, an end stop involving interengaging parts adapted when coupled together to secure one end of the stringers against detachment, said stringers having coupling links arranged longitudinally thereof with the end links at one end of the stringers arranged in close proximity to said parts, one of said parts including an integral link portion adapted to interlock with the end link of an opposed stringer, other interengaging means between said parts adjacent said integral link to prevent relative longitudinal movement of said parts when the links of the stringers are coupled together, a slider movable longitudinally of the stringers to couple and uncouple said links, said slider being movable into juxtaposition to said parts in coupling and uncoupling the same, and means involving a pawl-like latching element movably supported in connection with one of said parts and cooperating with said slider to retain the slider against displacement from said part when the other of said parts is detached.

15. In separable fasteners employing stringers with interengaging parts at one end thereof for detaching said end of the stringers and a slider for coupling and uncoupling the stringers, one of said parts comprising a channeled body having at one side thereof a bar portion projecting onto the stringer beyond the inner edge of said body, the other side of said body having a channel for receiving the other of said parts, said bar having a pivot pin portion extending in the direction of said channel, a vertically arranged coupling member mounted on said pin portion to move vertically between said bar and said second named part, and one end of the coupling member projecting outwardly through said body and having a pawl portion adapted to engage a part of said slider to retain the slider against displacement from said body when the second named part is detached.

16. In separable fasteners employing stringers with interengaging parts at one end thereof for attaching said end of the stringers and a slider for coupling and uncoupling the stringers, one of said parts comprising a channeled body having at one side thereof a bar portion projecting onto the stringer beyond the inner edge of said body, the other side of said body having a channel for receiving the other of said parts, said bar having a pivot pin portion extending in the direction of said channel, a vertically arranged coupling member mounted on said pin portion to move vertically between said bar and said second named part, one end of the coupling member projecting outwardly through said body and having a pawl portion adapted to engage a part of said slider to retain the slider against displacement from said body when the second named part is detached, and the other end portion of said coupling member being disposed within the channel of said body and having a cam portion adapted to be engaged by the second named part when inserted into said channel to move the pawl of said coupling member out of engagement with said slider.

17. In detachably coupled stringers for separable fasteners, an end stop involving interengaging parts adapted when coupled together to secure one end of the stringers against displacement, a slider movable longitudinally of the stringers to couple and uncouple the same, said slider being movable into position adjacent the end stop, the slider having top and bottom walls with a channel therebetween, means forming part of the end stop and movable therein for coupling the slider to the end stop when the end stop parts are separated, and said means having parts engaging top and bottom walls of the slider to key the slider against movement laterally with respect to the end stop when coupled therewith.

18. In detachably coupled stringers for separable fasteners, an end stop comprising a socket part secured to one stringer and a pin part secured to the other stringer and insertable into the socket part in coupling and securing the stringers together, said stringers having coupling links arranged longitudinally thereof with the end links at one end of the stringers arranged in close proximity to said parts, and said pin part including an integral link portion adapted to interlock with the end link of an opposed stringer.

19. In detachably coupled stringers for separable fasteners, an end stop comprising a socket part secured to one stringer and a pin part secured to the other stringer and insertable into the socket part in coupling and securing the stringers together, said stringers having coupling links arranged longitudinally thereof with the end links at one end of the stringers arranged in close proximity to said parts, said pin part including an integral link portion adapted to interlock with the end link of an opposed stringer, and other interengaging means between said parts adjacent said integral link to prevent relative longitudinal movement of said parts when the links of the stringers are coupled together.

20. In detachably coupled stringers for separable fasteners, an end stop involving interengaging parts adapted when coupled together to secure one end of the stringers against displacement, a slider movable longitudinally of the stringers to couple and uncouple the same, said slider having top and bottom walls with a channel therebetween, the inner surface of at least one of said walls having a groove, opening outwardly through one end of the slider, means forming part of the end stop and movable into said end portion of the slider and engaging a coupling element in the grooved wall of said slider for coupling the slider to the end stop, said means being movable through the groove in said slider, and said slider being retained against displacement from one part of the end stop when the other part of said end stop is detached.

DAVIS MARINSKY.